US005522546A

United States Patent [19]
Jarvis

[11] Patent Number: 5,522,546
[45] Date of Patent: Jun. 4, 1996

[54] VARIABLE EXHAUST NOZZLE SEAL

[75] Inventor: Graeme L. Jarvis, Marblehead, Mass.

[73] Assignee: General Electric Company, Cincinnati, Ohio

[21] Appl. No.: 292,703

[22] Filed: Aug. 19, 1994

[51] Int. Cl.⁶ .................. F16J 9/04; F02K 3/10; F02K 1/00
[52] U.S. Cl. .............. 239/265.19; 277/178; 277/212 FB
[58] Field of Search .................. 277/212 FB, 212 F, 277/178, 216, 169, 183, 184; 464/175; 239/265.19, 265.33, 265.35

[56] References Cited

U.S. PATENT DOCUMENTS

| | | | |
|---|---|---|---|
| 1,893,597 | 1/1933 | Queen | 277/216 |
| 2,517,693 | 8/1950 | Mead et al. | 277/178 |
| 3,738,669 | 6/1973 | Andersen et al. | 277/178 |
| 4,090,751 | 5/1978 | Krude | 308/191 |
| 4,112,709 | 9/1978 | Krude | 64/21 |
| 4,403,781 | 9/1983 | Riemscheid | 277/212 |
| 4,474,379 | 10/1984 | Holzer | 277/178 |
| 4,506,768 | 3/1985 | Innocent | 277/212 FB |
| 4,558,869 | 12/1985 | Grove et al. | 277/212 FB |
| 4,708,351 | 11/1987 | Midooka et al. | 277/184 |
| 4,892,254 | 1/1990 | Schneider et al. | 239/265.33 |
| 5,003,130 | 3/1991 | Danforth et al. | 277/178 |
| 5,046,990 | 9/1991 | Mikeska et al. | 464/175 |
| 5,051,105 | 9/1991 | Sugiura et al. | 464/175 |
| 5,078,652 | 1/1992 | Baker | 464/175 |
| 5,203,522 | 4/1993 | White et al. | 244/17.11 |
| 5,228,876 | 7/1993 | Woods | 277/212 FB |
| 5,236,204 | 8/1993 | Hempel | 277/212 FB |
| 5,351,888 | 10/1994 | Taylor et al. | 239/265.35 |

FOREIGN PATENT DOCUMENTS 705756   4/1941   Germany .......................... 277/212 FB

*Primary Examiner*—Daniel G. DePumpo
*Attorney, Agent, or Firm*—Andrew C. Hess; Wayne O. Traynham

[57] ABSTRACT

A seal includes a tubular body for receiving a translatable rod which extends from a cylinder through an access opening in a gas turbine engine casing. The body includes at one end thereof an integral annular land sized to surround the cylinder. At an opposite end of the body an integral grommet includes a groove extending around the perimeter thereof sized for receiving an edge of the casing defining the access opening for providing a seal therewith.

18 Claims, 5 Drawing Sheets

VARIABLE EXHAUST NOZZLE SEAL

The U.S. Government has rights in this invention in accordance with Contract No. N00019-91C-0030 awarded by the Department of the Navy.

BACKGROUND OF THE INVENTION

The present invention relates generally to gas turbine engines, and, more specifically, to a seal in an augmenter thereof having a variable exhaust nozzle.

In an augmented turbofan gas turbine engine for powering an aircraft in flight, the augmenter or afterburner is disposed at the aft end of the engine for providing additional thrust when desired. The augmenter includes a liner for containing the hot combustion gases, which liner is surrounded by an annular casing. At the downstream end of the casing is disposed a conventional variable area exhaust nozzle which is adjustable by a plurality of actuators disposed around the circumference of the casing. For example, three actuators may be equiangularly spaced apart, with each actuator having a translatable rod extending from an actuator cylinder, with translation of the rod being suitably converted for pivoting the several flaps of the exhaust nozzle in the various configurations required for operation in the flight envelope.

The engine is suitably mounted within an aircraft engine bay through which is channeled a predetermined amount of air during operation. The afterburner casing has an aft end configured for separating the engine bay from the exhaust nozzle, with the actuators being disposed in the engine bay upstream of the casing aft end. The casing aft end includes respective access openings through which the actuator rods extend for positioning the exhaust nozzle flaps as desired. The bay airflow flows downstream over the actuators and through the access openings and is suitably discharged from the exhaust nozzle.

However, flight testing has shown that under certain operating conditions in the aircraft flight envelope, a reverse differential pressure may be created which can cause flow from the exhaust nozzle through the access openings and upstream into the engine bay. Of course, the air in the exhaust nozzle itself is relatively hot and its leakage into the engine bay may provide a source of combustion ignition for any fuel vapors within the engine bay. The augmenter includes many fuel spraybars each being suitably connected to fuel lines which may leak fuel at some point during the operational lives of the fuel components. In order to reduce the potential for engine bay fires due to ignition from reverse flow of the hot exhaust nozzle air into the engine bay, it is desirable to seal the access openings in the casing aft end through which extend the actuator rods, as well as the access opening provided for a conventional position sensor.

SUMMARY OF THE INVENTION

A seal includes a tubular body for receiving a translatable rod which extends from a cylinder through an access opening in a gas turbine engine casing. The body includes at one end thereof an integral annular land sized to surround the cylinder. At an opposite end of the body an integral grommet includes a groove extending around the perimeter thereof sized for receiving an edge of the casing defining the access opening for providing a seal therewith.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
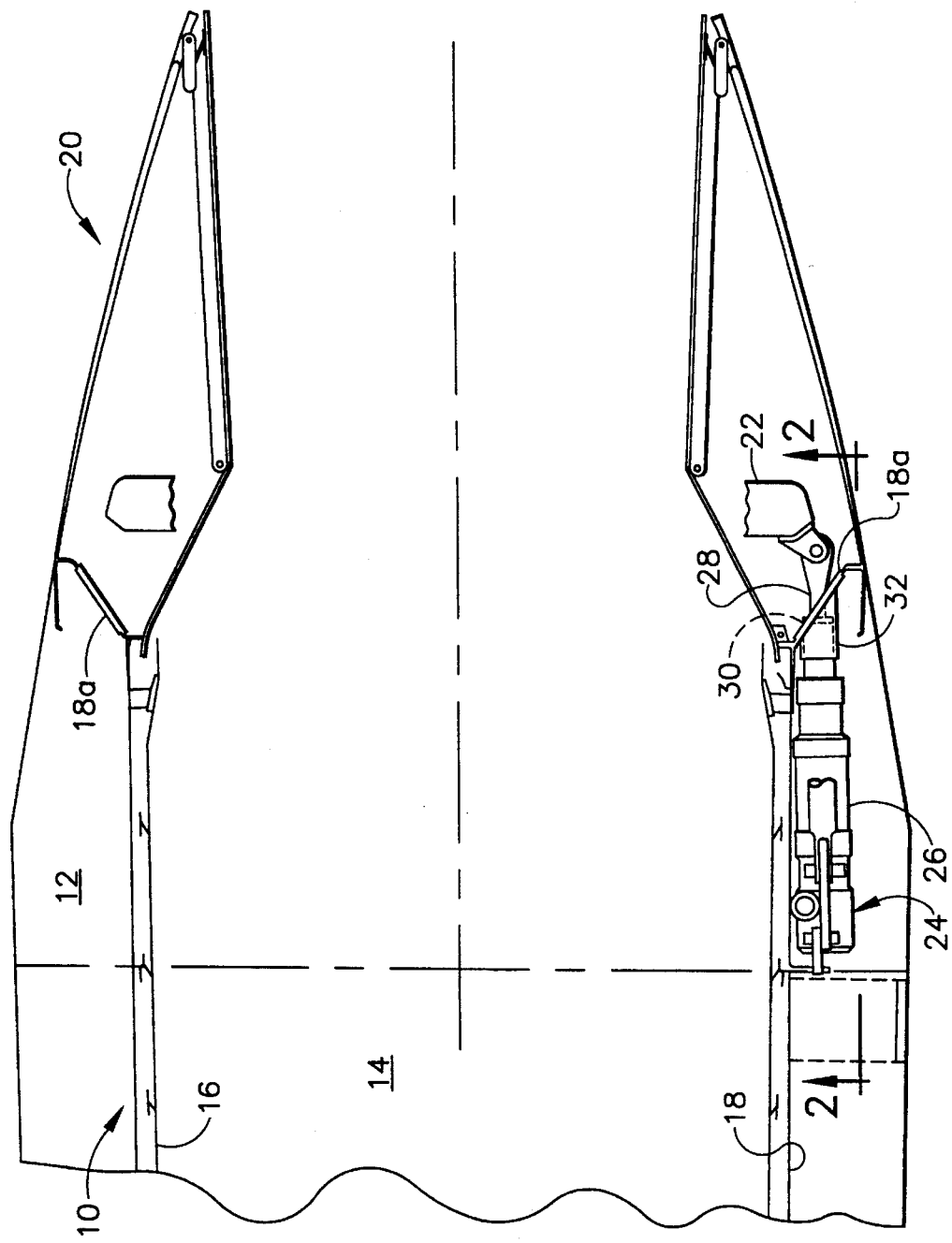
FIG. 1 is a schematic longitudinal sectional view through an aft end of an augmented turbofan gas turbine engine illustrating an actuator extending through a casing aft end to a variable exhaust nozzle.

Illustrated schematically in FIG. 1 is a longitudinal sectional view through the aft end of an augmented turbofan gas turbine engine 10 mounted in an engine bay 12 of an aircraft. The engine 10 includes a conventional augmenter or afterburner 14 having an augmenter combustion liner 16 which confines hot combustion gases generated during operation of the augmenter 14 upon the introduction and ignition of additional fuel from conventional augmenter fuel spraybars (not shown) disposed at an upstream end of the augmenter 14. The augmenter 14 further includes an annular outer casing 18 surrounding the liner 16 and around which is disposed the engine bay 12. An aft end 18a of the outer casing 18 is inclined in part radially outwardly from the centerline axis of the engine 10 and adjoins the outer wall of the aircraft which defines upstream therefrom the engine bay 12.

Disposed downstream from the casing aft end 18a is a conventional variable area exhaust nozzle 20 conventionally joined thereto. The nozzle 20 includes a plurality of primary and secondary exhaust flaps which are selectively positionable by an actuator ring 22 for varying the discharge flow area from the augmenter 14 as desired during engine operation in flight. Exhaust nozzle flaps are positioned by axial translation of the actuator ring 22 by a plurality of conventional actuators 24 which are suitably joined to the outer casing 18. In the exemplary embodiment illustrated in FIG. 1, the actuators 24 are spaced around the circumference of the outer casing 18, with each including an actuator cylinder 26 having a translatable output rod 28 which extends through an access opening 30 in the casing aft end 18a and is suitably joined to the ring 22 for providing translation thereof.

Figure 2:
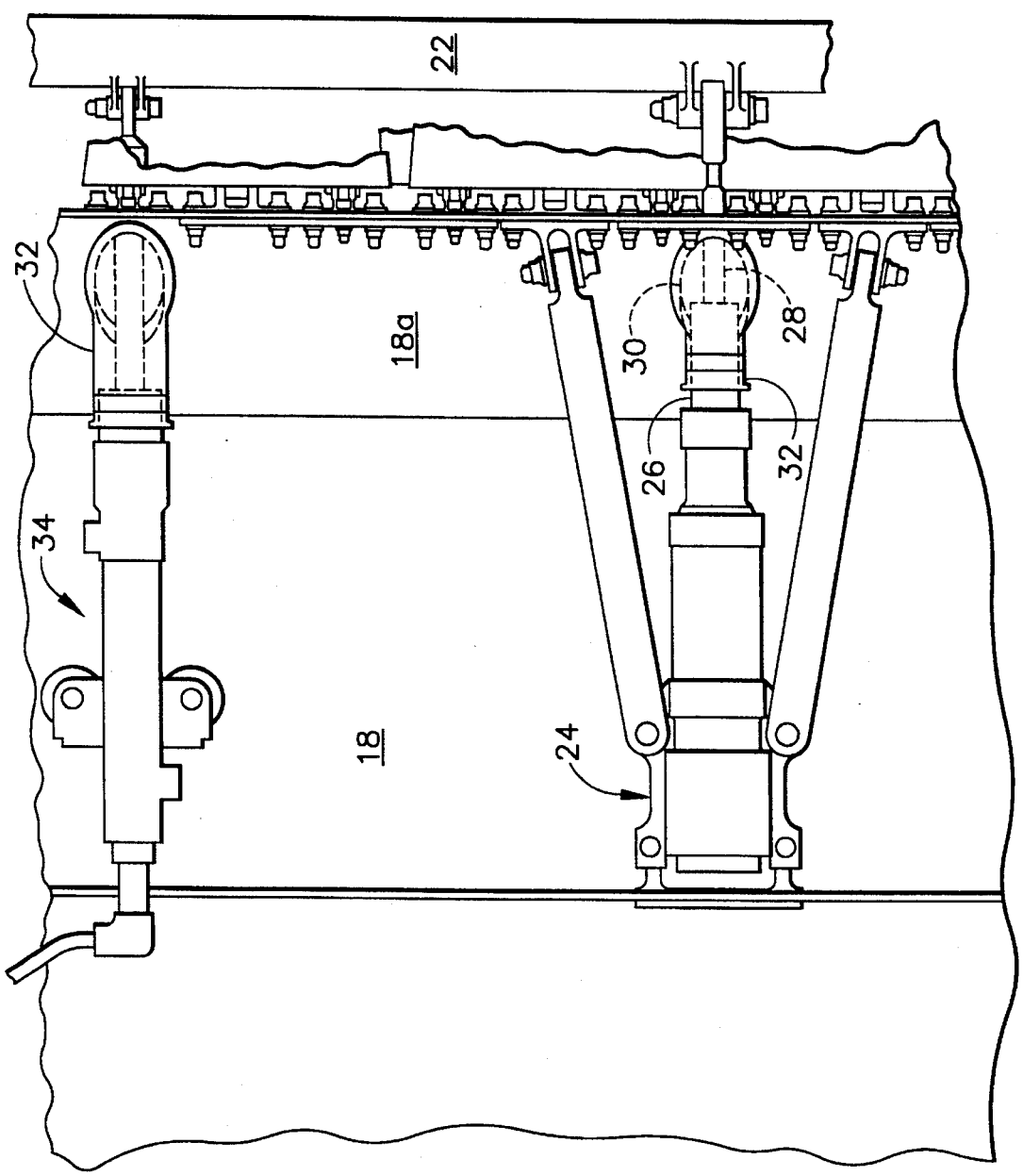
FIG. 2 is an external plan view of the augmenter aft end illustrated in FIG. 1 and taken generally along line 2—2 to show one of the actuators and a position sensor extending through the casing aft end into the variable exhaust nozzle.

In order to seal fluid flow through the access opening 30 between the engine bay 12 and the exhaust nozzle 20, a seal 32 in the form of a boot is provided around the aft end of the actuator cylinder 26 and is sealingly joined to the access opening 30. FIG. 2 illustrates in more particularly the seal 32 disposed around the end of one of the actuators 24, with similar seals 32 being disposed around the respective ends of the remaining actuators 24. Also illustrated in FIG. 2 is an exemplary position probe or sensor 34, also known as a linear variable differential transformer (LVDT), having a cylinder from which extends a translatable rod which extends through a respective aperture in the casing aft end 18a which is also joined to the actuator ring 22. Translation along the engine centerline axis of the ring 22 effected by the actuators 24 correspondingly translates the rod of the sensor 34 which provides a suitable feedback indication of the position of the ring 22. Since the sensor rod also extends through the casing aft end 18a, it too is suitably sealed with a suitably sized seal boot 32 restricting flow communication between the engine bay 12 and the exhaust nozzle 20.

Figure 3:
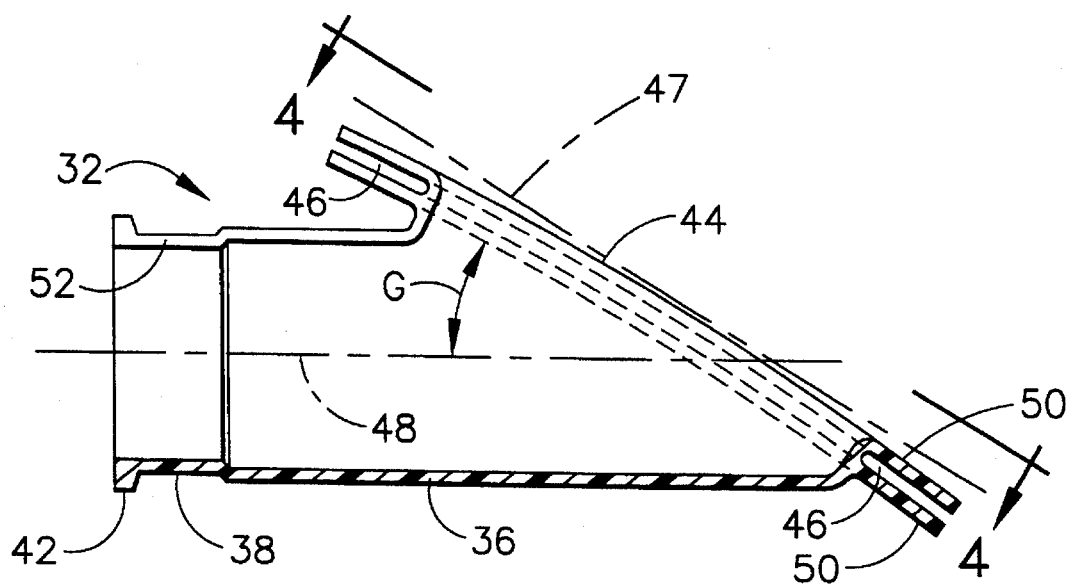
FIG. 3 is a transverse sectional view through a seal for the access openings in the casing aft end of FIGS. 1 and 2 in accordance with one embodiment of the present invention.
Figure 4:
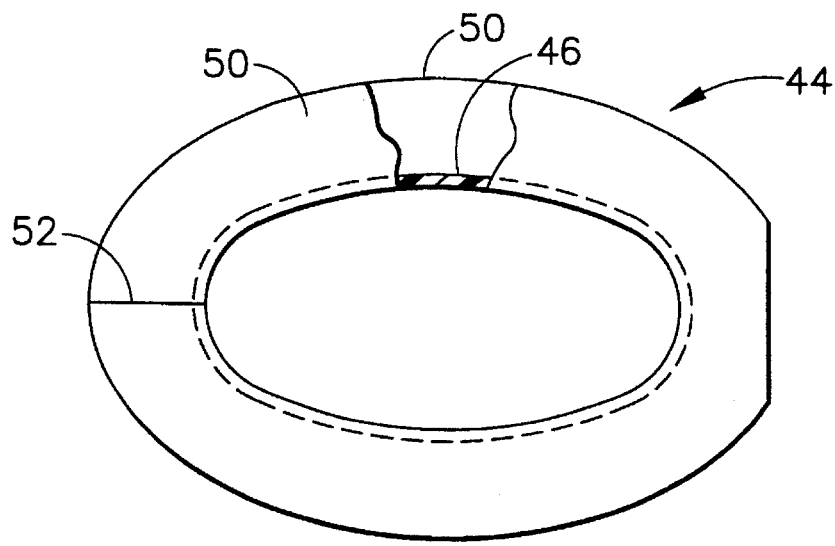
FIG. 4 is and end view of the seal illustrated in FIG. 3 and taken along line 4—4.

FIGS. 3 and 4 illustrate an exemplary embodiment of the seal 32 which includes a tubular body 36 for receiving axially therethrough the translatable rod 28 of the actuator 24 illustrated in FIG. 1 and 2, or the corresponding output rod of the position sensor 34. The body 36 includes at one, forward end thereof an integral annular land 38 which is suitably sized to surround the cylinder 26, as shown in more particularity in FIG. 5. For example, the nominal inner diameter of the land 38 is equal to the nominal outer diameter of the cylinder 26, and after assembly of the land 38 around the cylinder 26 a suitable band clamp 40 is clamped therearound to provide both attachment of the body 36 to the cylinder 26 and a seal therewith. At the forwardmost end of the land 38 is an annular bead 42 which may be used to prevent the band clamp 40 from slipping off the end of the land 38.

Referring again to FIGS. 3 and 4, the body 36 further includes at an opposite, aft end thereof an integral grommet 44 having a groove 46 extending around the outer perimeter thereof. The body 36 is primarily cylindrical in configuration with an axial centerline axis 48 as shown in FIG. 3. The grommet 44 and the groove 46 therein extend generally radially outwardly from the centerline axis 48 and are sized for receiving an edge of the casing aft end 18a which defines the access opening 30 for providing a seal therewith as illustrated in more particularity in FIG. 5. As shown in FIGS. 3 and 4, the grommet groove 46 is defined by a pair of spaced apart annular flanges or flaps 50 which extend radially outwardly from the body 36 and are positionable on opposite sides of the casing aft end 18a around the access opening 30 for sealing the body 36 to the casing aft end 18a as illustrated in FIG. 5.

Figure 5:
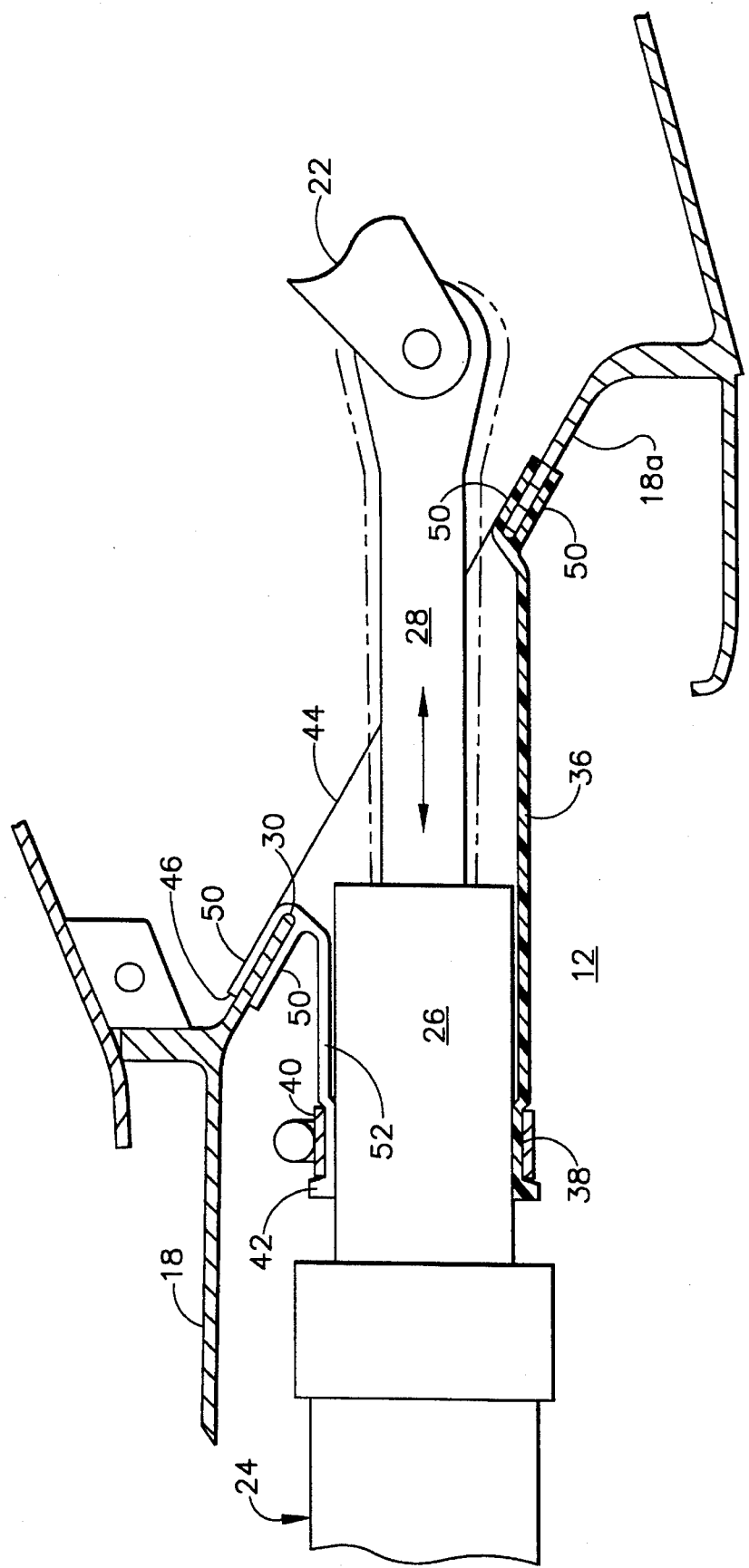
FIG. 5 is an enlarged, partly sectional view of the seal illustrated in FIG. 3 shown installed over the aft end of an exemplary actuator having a translatable output rod extending through the access opening in the casing aft end.

In the exemplary embodiment illustrated in FIGS. 3 and 5, the casing aft end 18a is inclined relative to the cylindrical, main portion of the casing 18 and, therefore, the grommet 44 is correspondingly inclined at an acute angle G relative to the axial centerline axis 48 of the body 36 which therefore results in an elliptical profile, with elliptical center passage as shown in FIG. 4.

In the preferred embodiment of the present invention, the seal 32 is formed of a plurality of plies of a fire resistant fabric, such as that known under the Nomex trademark, reinforced with silicone elastomer which is commercially available from the Kirkhill Rubber Company of Brea of California. Flexibility, and correspondingly stiffness, of the seal 38 is controlled primarily by the number of plies of the impregnated fabric. The fabric also provides a load bearing structure for withstanding pressure and/or translation loads which occur during operation.

In the preferred embodiment of the invention, the seal 32, including the body 36 and grommet 44, is flexible for allowing the grommet flaps 50 to be resiliently distorted for assembly to the access opening 30, as well as for allowing differential movement between the cylinder 26 and the casing aft end 18a at the access opening 30 during operation. FIG. 5 illustrates in phantom line slight angular movement range of the output rod 28 as it is translated axially for positioning the ring 22. The size of the access hole 30 is substantially larger than the rod 28 which extends therethrough for providing suitable clearances therebetween to prevent interference during operation. The seal 32 is joined between the cylinder 26, which is a stationary component, and the casing aft end 18a around the opening 30, which is also a stationary component, for providing an effective seal around the opening 30. Flexibility of the body 36 allows for the slight angular pivoting of the cylinder 26 during operation while still providing an effective seal.

As shown in FIG. 3, the grommet flaps 50 in their initial unloaded state are radially arcuate, or pre-bowed, with respect to reference line 47, so that opposing faces thereof which define the groove 46 are complementarily convex and concave for improving sealing with the casing aft end 18a around both sides of the access opening 30 upon assembly as illustrated in FIG. 5. As shown in FIG. 5, the casing aft end 18a around the opening 30 is flat, with the grommet flaps 50 being resiliently distorted from their initial curved configurations to conform to the flat configuration of the casing aft end 18a. In this way, an improved seal is provided on both sides of the casing aft end 18a within the groove 46.

Although the seal body 36 may be circumferentially continuous as described below, in the preferred embodiment illustrated in FIGS. 3–5, the body 36 includes an axial split 52 through one side thereof from the land 38 to the grommet 44 for allowing the body 36 to be resiliently opened along the split 52 for assembly around the cylinder 26 and the rod 28 thereof. This allows installation and removal of the seal 32 from the preassembled actuator and ring 22. As shown in FIGS. 3 and 5, the radially inner end of the seal 32 relative to the centerline axis of the augmenter itself, is axially split as indicated by the absence of crosshatching in these Figures. Since the split 52 itself provides a potential leakage path, the body 36 is preferably configured to provide a compressive preload in the hoop direction of the body 36 for closing together the axial split 52 in abutting contact to reduce leakage flow therethrough. And, the split 52 is preferably located in the seal 36 at its minimum axial length for minimizing the potential leakage path.

In an exemplary embodiment, about four or five plies of the silicone impregnated fabric are used to provide a body 36 which is sufficiently flexible for allowing assembly over the cylinder 26 and around the access opening 30, but is suitably stiff so that the corresponding mating edges of the axial split 52 may abut each other with a suitable hoop-direction compressive preload created by the flexibility of the body 36 itself. The several plies of the body 36 may be conventionally manufactured using a suitable form so that a resulting elastically induced preload in the hoop direction is created. After assembly, the band clamp 40 ensures a tight joint at the split 52 at that end of the body 36, whereas the assembled grommet 44 around the access opening 30 ensures effective closure of the split 52 at that end of the body 36. By so constraining both ends of the body 36, the split 52 therebetween is in turn additionally constrained for maintaining an effective butt joint having a corresponding sealing effect.

Figure 6:
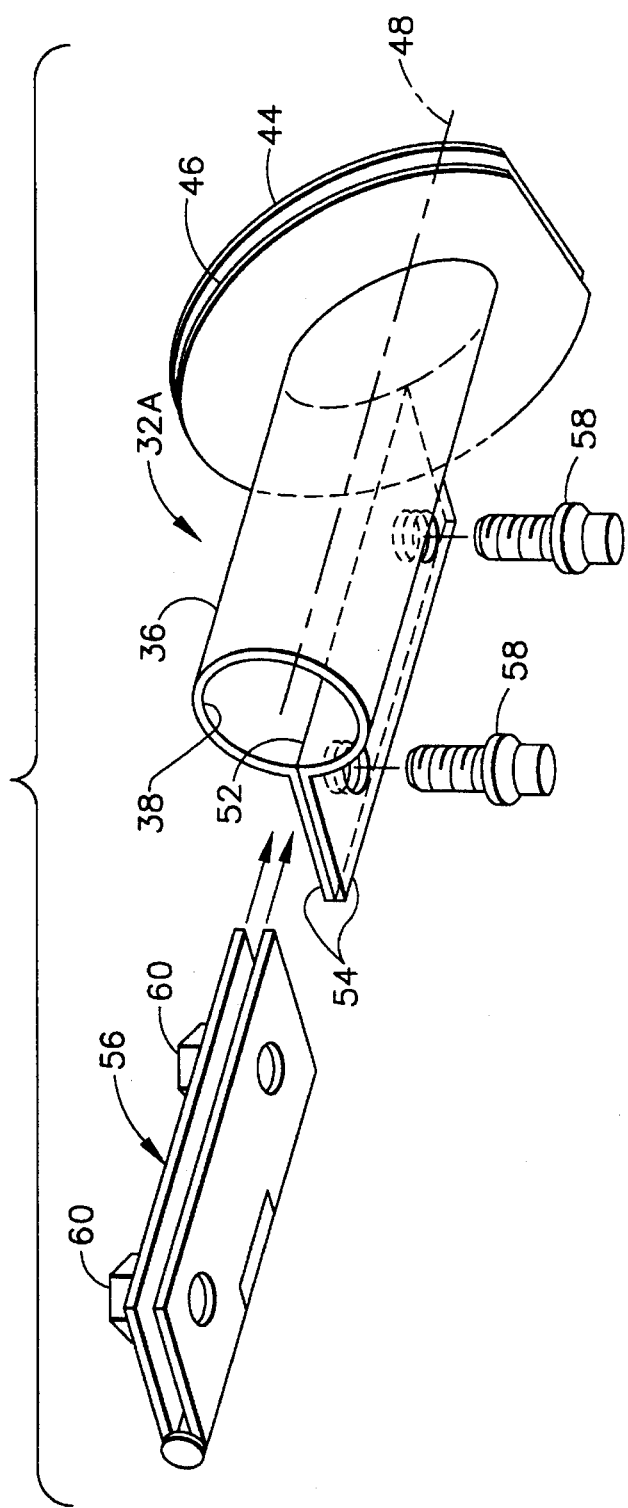
FIG. 6 is an exploded perspective view of a seal in accordance with another embodiment of the present invention.

Illustrated in FIG. 6 is an alternate embodiment of the seal designated 32A which similarly has a tubular body 36 and the grommet 44 integrally joined thereto. In this embodiment, however, instead of the complementary band clamp 40 clamping the land 38, the body 36 includes a pair of integral flanges 54 which extend radially outwardly from the centerline axis 48 thereof, and extend along the entire body 36 from the land 38 to the grommet 44 on respective sides of the split 52. The flanges 54 are preferably flat or planar for being clamped together to provide a seal therebetween for preventing flow leakage along the split 52. In the exemplary embodiment illustrated in FIG. 6, a hinge-type clamp 56 includes flat plates hinged together along one edge and configured for sandwiching therebetween the two flanges 54 of the seal 32A. Suitable apertures are provided through the hinge clamp 56 and the flanges 54 through which are positionable a pair of bolts 58, for example, which threadingly engage a pair of nuts 60 joined to one of the plates of the clamp 56. The hinge clamp 56 provides a uniform clamping force across the flanges 54 with a resulting effective seal therebetween. The clamp 56 also is effective for clamping the land 38 around the cylinder 26 without the need for using the band clamp 40 illustrated in FIG. 5.

Figure 7:
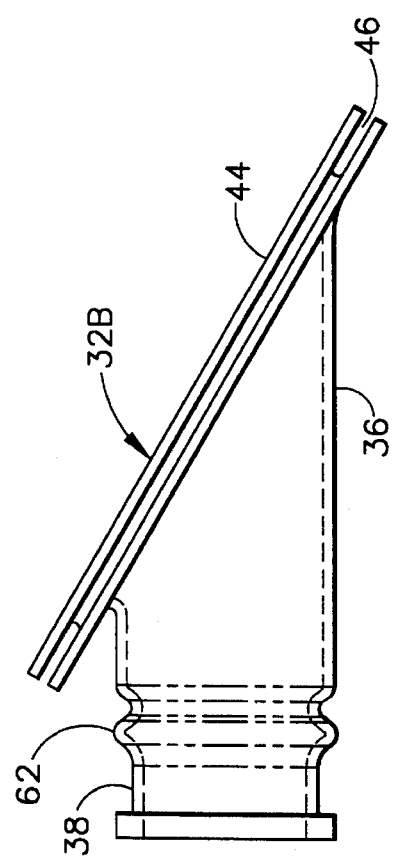
FIG. 7 is a side elevation view of a seal in accordance with an alternate embodiment of the present invention.

Illustrated in FIG. 7 is yet another embodiment of the seal in accordance with the present invention and designated 32B. In this embodiment the body 36 is circumferentially continuous without having an interruption such as the axial split 52 described above. In this embodiment, the seal 32B must firstly be installed around the access opening 30, before the cylinder 26 and actuator rod 28 may be assembled therethrough. The band clamp 40 (see FIG. 5) then clamps the forward most end of the seal 32B to the cylinder 26 to complete the assembly. Also in this embodiment, the seal body 36 is more effective for withstanding differential pressure across the walls thereof from inside-to-outside of the body 36 since continuous load bearing material is provided around its circumference.

FIG. 7 also illustrates that the body 36 of any of the embodiments described may also include an integral bellows 62 therein at a suitable location such as adjacent to the land 38. The bellows 62 allows for extension and contraction translation movement between the land 38 and the grommet 44 along the centerline axis 48 of the seal. Although the seal body 36 may be configured to elastically expand and contract in all required directions, the bellows 62 may be used when desired for providing increased extension and contraction capability. Since the body 36 is formed of plurality of plies of impregnated fabric, the fabric itself is not readily extendable although it may be deformed laterally. The bellows 62 may, therefore, provide any required extension and contraction capability as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A seal for an access opening in a gas turbine engine casing through which extends a rod translatable from a cylinder, said seal comprising:

a tubular body for receiving therethrough said translatable rod and including a plurality of resin impregnated fabric plies;

said body including at one end thereof an integral annular land sized to surround said cylinder for being clamped thereto to provide a seal therewith;

said body further including at an opposite end thereof an integral grommet having a groove extending around a perimeter thereof and sized for receiving an edge of said casing defining said opening for providing a seal therewith; and wherein said casing is flat around said opening and said grommet flaps are radially arcuate and pre-bowed in an unloaded state so that opposing faces thereof defining said groove are complementarily convex and concave from a reference point between said opposing faces for improving abutting sealing with said casing around both sides of said access opening.

2. A seal according to claim 1 wherein said grommet groove is defined by a pair of spaced apart annular flaps positionable on opposite sides of said casing around said opening for sealing said body to said casing.

3. A seal according to claim 2 wherein said body including said grommet is flexible for allowing said grommet flaps to be resiliently distorted for assembly to said access opening, and for allowing differential movement between said cylinder and said casing at said access opening.

4. A seal according to claim 3 wherein said body is circumferentially continuous and effective for withstanding differential pressure thereacross.

5. A seal according to claim 3 wherein said grommet is inclined relative to an axial centerline axis of said body and has an elliptical profile and an elliptical center passage.

6. A seal according to claim 3 wherein said body further includes an integral bellows therein for allowing extension and contraction translation movement between said land and said grommet.

7. A seal according to claim 3 wherein said body includes an axial split from said land to said grommet for allowing said body to be resiliently opened along said split for assembly around said cylinder and rod thereof.

8. A seal according to claim 7 wherein said body is configured to provide a preload in a hoop direction thereof for closing said axial split to reduce leakage flow therethrough.

9. A seal according to claim 7 further including a pair of integral flanges extending along said body from said land to said grommet on respective sides of said split, said flanges being planar for being clamped together to provide a seal therebetween for preventing flow leakage along said split.

10. A seal in combination with an access opening in a gas turbine engine casing through which extends a rod translatable from a cylinder, said seal comprising:

a tubular body receiving therethrough said translatable rod;

said body including at one end thereof an integral annular land sized to surround said cylinder for being clamped thereto to provide a seal therewith; and said body further including at an opposite end thereof an integral grommet having a groove extending around a perimeter thereof receiving an edge of said casing defining said opening for providing a seal therewith; and wherein said casing is flat around said opening and said grommet flaps are radially arcuate and pre-bowed in an unloaded state so that opposing faces thereof defining said groove are complementarily convex and concave from a reference point between said opposing faces for improving abutting sealing with said casing around both sides of said access opening.

11. A combination according to claim 10 wherein said grommet groove is defined by a pair of spaced apart annular flaps positioned on opposite sides of said casing around said opening for sealing said body to said casing.

12. A combination according to claim 11 wherein said body including said grommet is flexible for allowing said grommet flaps to be resiliently distorted for assembly to said access opening, and for allowing differential movement between said cylinder and said casing at said access opening.

13. A combination according to claim 12 wherein said body is circumferentially continuous and effective for withstanding differential pressure thereacross.

14. A combination according to claim 12 wherein said grommet is inclined relative to an axial centerline axis of said body and has an elliptical profile and an elliptical center passage.

15. A combination according to claim 12 wherein said body further includes an integral bellows therein for allowing extension and contraction translation movement between said land and said grommet.

16. A combination according to claim 12 wherein said body includes an axial split from said land to said grommet for allowing said body to be resiliently opened along said split for assembly around said cylinder and rod thereof.

17. A combination according to claim 16 wherein said body is configured to provide a preload in a hoop direction thereof for closing said axial split to reduce leakage flow therethrough.

18. A combination according to claim 16 further including a pair of integral flanges extending along said body from said land to said grommet on respective sides of said split, said flanges being planar for being clamped together to provide a seal therebetween for preventing flow leakage along said split.

* * * * *